US012410036B2

(12) United States Patent
Yoshino

(10) Patent No.: US 12,410,036 B2
(45) Date of Patent: Sep. 9, 2025

(54) FAILURE DETECTION DEVICE FOR AN ELEVATOR

(71) Applicant: Mitsubishi Electric Corporation, Tokyo (JP)

(72) Inventor: Jumpei Yoshino, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1251 days.

(21) Appl. No.: 17/266,640

(22) PCT Filed: Sep. 10, 2018

(86) PCT No.: PCT/JP2018/033421

§ 371 (c)(1),
(2) Date: Feb. 8, 2021

(87) PCT Pub. No.: WO2020/053925

PCT Pub. Date: Mar. 9, 2020

(65) Prior Publication Data

US 2021/0347605 A1 Nov. 11, 2021

(51) Int. Cl.
*B66B 5/00* (2006.01)
*B66B 3/02* (2006.01)
*B66B 5/02* (2006.01)

(52) U.S. Cl.
CPC .............. *B66B 5/0031* (2013.01); *B66B 3/02* (2013.01); *B66B 5/0087* (2013.01); *B66B 5/022* (2013.01)

(58) Field of Classification Search
CPC ....... B66B 5/0031; B66B 5/0087; B66B 3/02; B66B 5/022
See application file for complete search history.

(56) References Cited

U.S. PATENT DOCUMENTS

| | | | | |
|---|---|---|---|---|
| 4,117,908 A * | 10/1978 | Nara | B66B 7/06 187/254 |
| 5,149,922 A * | 9/1992 | Kondou | B66B 1/3484 187/401 |
| 7,360,629 B2 * | 4/2008 | Hagi | B66B 1/2458 187/383 |

(Continued)

FOREIGN PATENT DOCUMENTS

JP 2014-210620 A 11/2014

OTHER PUBLICATIONS

International Search Report and Written Opinion mailed on Nov. 27, 2018, received for PCT Application PCT/JP2018/033421, Filed on Sep. 10, 2018, 8 pages including English Translation.

*Primary Examiner* — Rina I Duda
(74) *Attorney, Agent, or Firm* — XSENSUS LLP

(57) ABSTRACT

A failure detection device for an elevator is provided. The failure detection device includes: a mobile unit that is movable in a hoistway in an up-down direction independently of a car; a distance measurement unit that is mounted to the mobile unit and is configured to measure a horizontal distance; and a control unit including: a movement amount calculator; a car height position acquirer; a reference value storage; a measurement value acquirer; and a determiner. The failure detection device determines whether a failure has occurred in the hoistway based on the measurement value and the reference value stored in the reference value storage in association with the absolute position at which the measurement value has been measured.

11 Claims, 11 Drawing Sheets

(56) References Cited

U.S. PATENT DOCUMENTS

| | | | | |
|---|---|---|---|---|
| 10,836,606 | B2 * | 11/2020 | Helenius | B66B 7/1238 |
| 2004/0094366 | A1 * | 5/2004 | Weinberger | B66B 5/0025 187/247 |
| 2016/0041284 | A1 * | 2/2016 | Rokkan | F16L 1/235 29/714 |

* cited by examiner

Fig. 6

| Distance Measurement Unit 12a | | Distance Measurement Unit 12b | |
|---|---|---|---|
| Angle [deg] | Distance [m] | Angle [deg] | Distance [m] |
| 0 | 2.85 | 0 | *.** |
| 1 | 2.86 | 1 | *.** |
| 2 | 2.85 | 2 | *.** |
| ⋮ | ⋮ | ⋮ | ⋮ |
| 359 | 2.75 | 359 | *.** |

Fig. 7

| Absolute Position of Mobile Unit [m] | Distance Measurement Unit 12a | | Distance Measurement Unit 12b | |
|---|---|---|---|---|
| | Angle [deg] | Distance [m] | Angle [deg] | Distance [m] |
| 0.1 | 0 | 2.85 | 0 | *.** |
| | 1 | 2.86 | 1 | *.** |
| | 2 | 2.85 | 2 | *.** |
| | ⋮ | ⋮ | ⋮ | ⋮ |
| | 359 | 2.75 | 359 | *.** |
| 0.2 | 0 | *.** | 0 | *.** |
| | 1 | *.** | 1 | *.** |
| | 2 | *.** | 2 | *.** |
| | ⋮ | ⋮ | ⋮ | ⋮ |
| | 359 | *.** | 359 | *.** |
| ⋮ | ⋮ | | ⋮ | |

FAILURE DETECTION DEVICE FOR AN ELEVATOR

CROSS-REFERENCE TO RELATED APPLICATION

The present application is based on PCT filing PCT/JP2018/033421, filed Sep. 10, 2018, the entire contents of which are incorporated herein by reference.

TECHNICAL FIELD

The present invention relates to a failure detection device for an elevator capable of detecting a failure in a hoistway.

BACKGROUND ART

Hitherto, there has been known a failure detection device for an elevator capable of detecting a failure of a hoistway wall and failures including deformation and drop-out of an apparatus installed in the hoistway at the time of, for example, maintenance and inspection after an earthquake occurs (see, for example, Patent Literature 1).

In the failure detection device of Patent Literature 1, a distance sensor capable of measuring a horizontal distance is mounted to an upper portion or a lower portion of a car of an elevator. The failure detection device is configured to measure, after moving the car to a set position, a horizontal distance to a hoistway wall or an apparatus installed in the hoistway by a distance sensor.

A control unit of the failure detection device is configured to determine that a failure has occurred when a difference between the measured horizontal distance and a reference value is equal to or larger than a threshold value. In addition, Patent Literature 1 also includes description that those operations are performed over the entire length of the hoistway.

CITATION LIST

Patent Literature

[PTL 1] JP 2014-210620 A

SUMMARY OF INVENTION

Technical Problem

According to the failure detection device of Patent Literature 1, after the car is moved to the set position, the horizontal distance is measured by the distance sensor. Therefore, for example, when it is desired to detect a failure after the occurrence of an earthquake has been detected and the elevator has stopped, it is required to cause the car to run without knowing whether or not there has occurred anyone of a failure of a hoistway wall and failures including deformation and drop-out of an apparatus installed in a hoistway.

The present invention has been made to solve the above-mentioned problem, and has an object to provide a failure detection device for an elevator capable of detecting a failure in a hoistway without causing a car to run.

Solution to Problem

In order to achieve the above-mentioned object, according to one embodiment of the present invention, there is provided a failure detection device for an elevator including: a mobile unit that is movable in a hoistway in an up-down direction independently of an elevating body; a distance measurement unit that is mounted to the mobile unit and is configured to measure a horizontal distance; and a control unit including: a movement amount calculator configured to control the mobile unit and the distance measurement unit to calculate a movement amount of the mobile unit in the hoistway in the up-down direction; an elevating body height position acquirer configured to acquire a height position of the elevating body in the hoistway; a reference value storage configured to store, as a reference value, the horizontal distance at a set position in the hoistway; a measurement value acquirer configured to acquire, as a measurement value, the horizontal distance measured by the distance measurement unit at an absolute position of the mobile unit calculated based on the height position of the elevating body and the movement amount of the mobile unit from the height position of the elevating body; and a determiner configured to determine whether a failure has occurred in the hoistway based on the measurement value and the reference value stored in the reference value storage in association with the absolute position at which the measurement value has been measured.

Advantageous Effects of Invention

The failure detection device for an elevator according to the present invention can detect a failure in the hoistway without causing the car to run.

BRIEF DESCRIPTION OF DRAWINGS

FIG. 6 is a table for showing an example of data on the horizontal distances measured by the mobile unit of the failure detection device for an elevator according to the first embodiment of the present invention.

FIG. 7 is a table for showing an example of the reference values of the failure detection device for an elevator according to the first embodiment of the present invention.

DESCRIPTION OF EMBODIMENTS

Now, with reference to the accompanying drawings, an embodiment of the present invention is described in detail. The embodiment described below is one example, and the present invention is not limited to this embodiment.

First Embodiment

Figure 1:
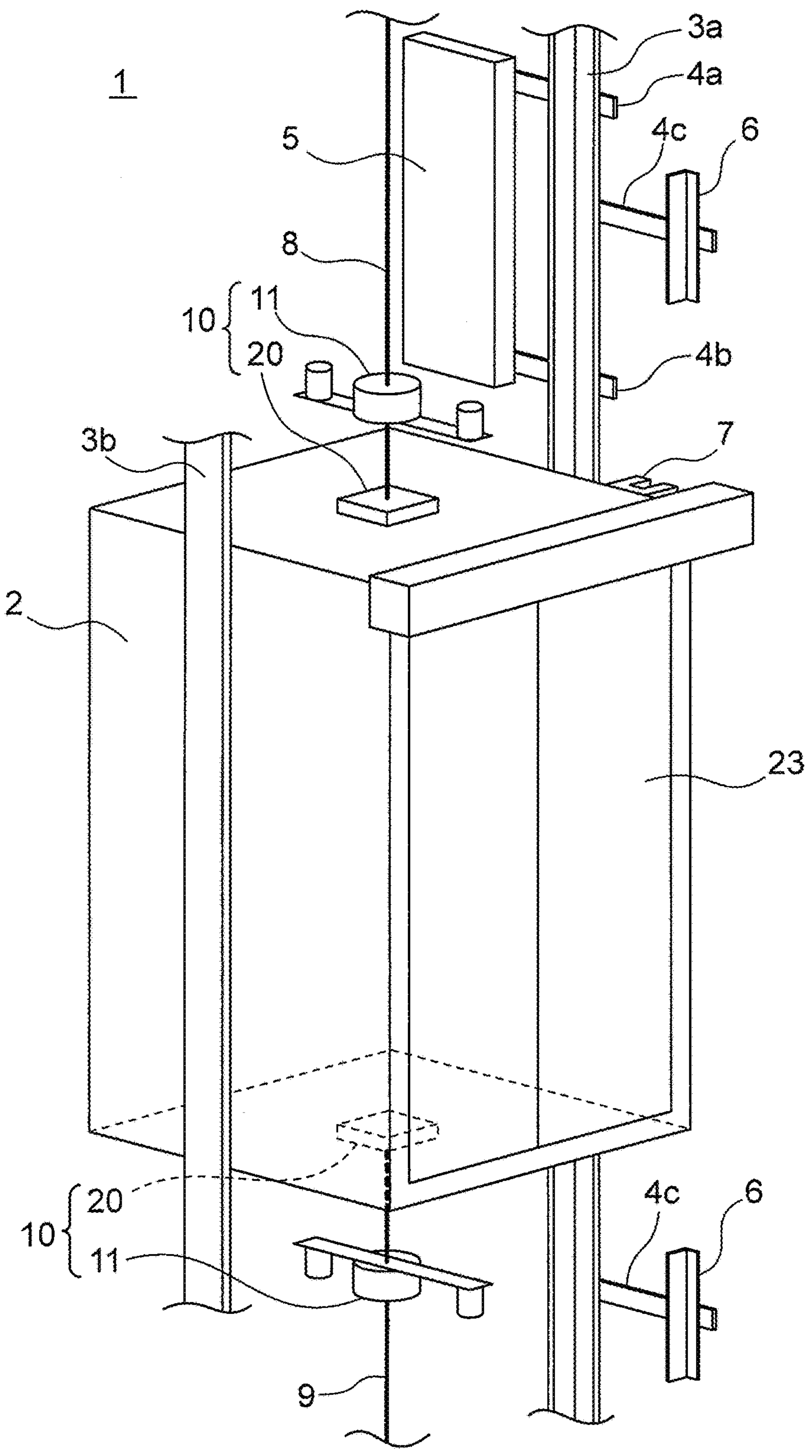
FIG. 1 is a configuration diagram of apparatus installed in a hoistway of an elevator in a first embodiment of the present invention.

FIG. 1 is a configuration diagram of apparatus installed in a hoistway of an elevator in a first embodiment of the present invention. In FIG. 1, a pair of car guide rails 3*a* and 3*b* for guiding the raising and lowering of a car 2 serving as an elevating body are provided in a hoistway 1.

A control panel 5 configured to control the raising and lowering of the car 2 is fixed to the car guide rail 3*a* through intermediation of mounting plates 4*a* and 4*b*. In addition, a detection plate 6 is fixed to the car guide rail 3*a* through intermediation of a mounting plate 4*c*.

The detection plate 6 is provided at each floor. The detection plate 6 is used for detecting a landing position of the car 2 by engaging with a landing position detector 7 mounted on the car 2 side.

In each of an upper portion and a lower portion of the car 2, there is arranged a failure detection device 10 configured to detect a failure of a hoistway wall and failures including deformation and drop-out of an apparatus installed in the hoistway 1. The failure detection device 10 includes a mobile unit 11 configured to move in an up-down direction in the hoistway 1 independently of the car 2 and a control unit 20 fixed to the upper portion or the lower portion of the car 2.

The mobile unit 11 of the failure detection device 10 arranged in the upper portion of the car 2 is configured to move in the up-down direction in the hoistway 1 independently of the car 2 along a main rope 8 extending from a top surface of the car 2. The mobile unit 11 of the failure detection device 10 arranged in the lower portion of the car 2 is configured to move in the up-down direction in the hoistway 1 independently of the car 2 along a compensating rope 9 extending from a bottom surface of the car 2.

Figure 2:
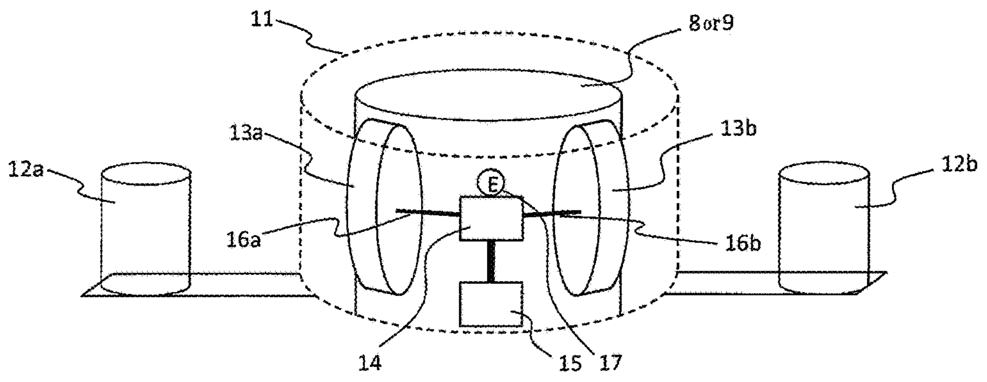
FIG. 2 is a configuration diagram of a mobile unit of a failure detection device for an elevator according to the first embodiment of the present invention.

FIG. 2 is a configuration diagram of details of the mobile unit 11. In FIG. 2, the mobile unit 11 includes active wheels 13*a* and 13*b* configured to grip the main rope 8 or the compensating rope 9 and move along the main rope 8 or the compensating rope 9.

The mobile unit 11 also includes arms 16*a* and 16*b* configured to apply a force to push the active wheels 13*a* and 13*b* against the main rope 8 or the compensating rope 9.

The mobile unit 11 further includes an electric motor 14 serving as a drive source for the active wheels 13*a* and 13*b*, and an electricity storage 15 configured to supply electric power to the electric motor 14.

An encoder 17 configured to output a pulse signal corresponding to the number of revolutions of the electric motor 14 is mounted to the electric motor 14. The pulse signal output from the encoder 17 is output to the control unit 20 described above.

Further, distance measurement units 12*a* and 12*b* each configured to measure horizontal distances over the entire circumference of 360 degrees centering on itself are mounted to the mobile unit 11. The distance measurement units 12*a* and 12*b* are each formed of a laser-type distance sensor. In this case, the horizontal distance refers to a horizontal distance from the distance measurement unit 12*a* or 12*b* to the hoistway wall or the apparatus installed in the hoistway.

The distance measurement unit 12*a* and the distance measurement unit 12*b* are installed symmetrically with respect to the mobile unit 11 so that the center of gravity of the two distance measurement units 12*a* and 12*b* matches the center of the main rope 8 or the compensating rope 9. This improves the stability of the mobile unit 11.

The number of distance measurement units is not limited to two, and may be a freely-set number of one or more. No matter how many distance measurement units are used, the distance measurement units are installed symmetrically with respect to the mobile unit 11 so that the center of gravity of the distance measurement units matches the center of the main rope 8 or the compensating rope 9, to thereby improve the stability of the mobile unit 11.

Figure 3:
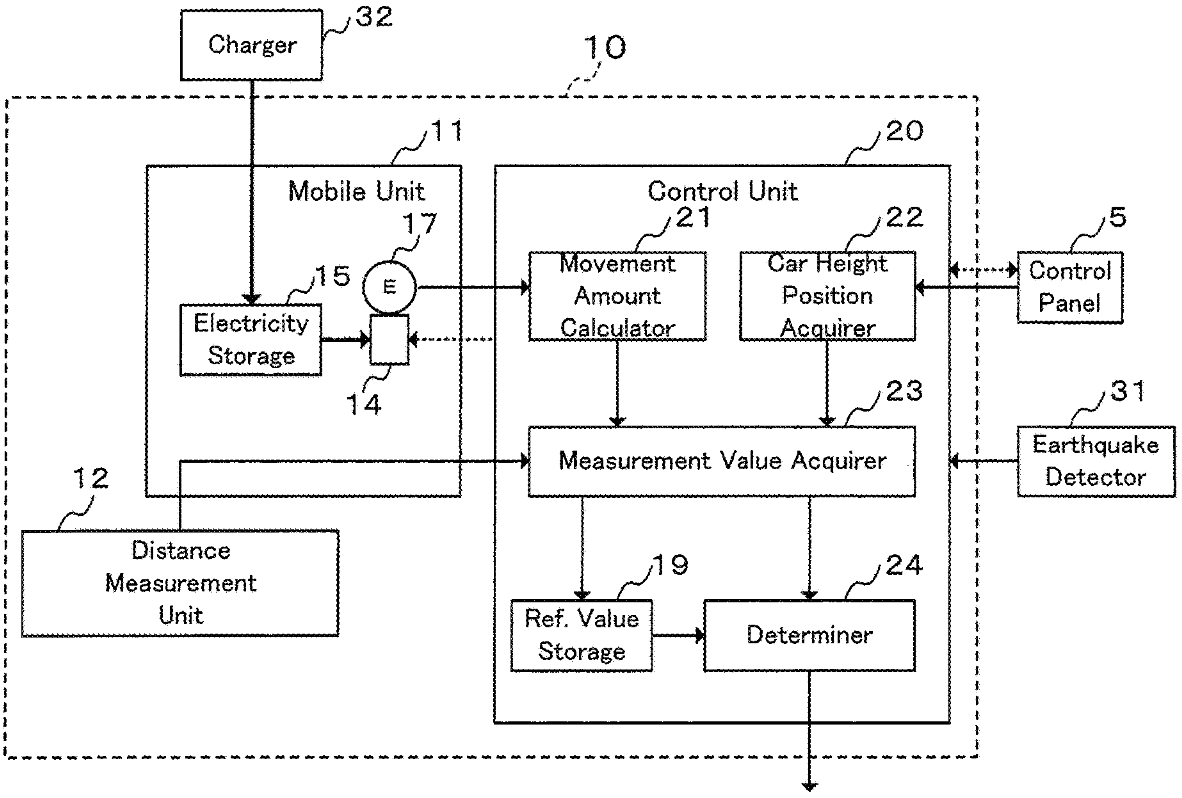
FIG. 3 is a system configuration diagram of the failure detection device for an elevator according to the first embodiment of the present invention.

FIG. 3 is a system configuration diagram of the failure detection device 10. In FIG. 3, the failure detection device 10 includes the mobile unit 11 described above, the distance measurement units 12*a* and 12*b* mounted to the mobile unit 11, and the control unit 20. In FIG. 3, the distance measurement units 12*a* and 12*b* are collectively indicated by reference numeral 12.

The control unit 20 is formed of, for example, a microcomputer, and is configured to control various operations of the failure detection device 10. The control unit 20 is further configured to exchange various instruction signals with the control panel 5 to acquire a state of the car 2 and indirectly control the car 2. In addition, at the time of the occurrence of an earthquake, a detection signal received from an earthquake detector 31 is input to the control unit 20.

The control unit 20 also includes a movement amount calculator 21, a car height position acquirer 22, a measurement value acquirer 23, a reference value storage 19, and a determiner 24. Those modules may be implemented in a hardware manner or a software manner in the control unit 20.

The movement amount calculator 21 is configured to calculate a movement amount of the mobile unit 11 in the up-down direction with respect to the car 2 in the hoistway 1.

The car height position acquirer 22 is configured to acquire a height position of the car 2 in the hoistway 1 from the control panel 5.

The reference value storage 19 is configured to store the horizontal distances at a set position in the hoistway 1 as reference values.

The measurement value acquirer 23 is configured to calculate an absolute position of the mobile unit 11, for example, the height position of the mobile unit 11 with respect to the lowermost floor or the uppermost floor, based on the movement amount of the mobile unit 11 in the up-down direction, which is calculated by the movement amount calculator 21, and the height position of the car 2 acquired by the car height position acquirer 22.

The measurement value acquirer 23 is also configured to acquire, as measurement values, the horizontal distances measured by the distance measurement units 12*a* and 12*b* at a current absolute position of the mobile unit 11 in the hoistway 1.

The determiner 24 is configured to determine whether or not there has occurred any one of a failure of the hoistway wall and the failures including the deformation and drop-out of the apparatus installed in the hoistway 1, based on the measurement values acquired by the measurement value acquirer 23 and the reference values corresponding to the measurement values stored in the reference value storage 19.

The electricity storage 15 built into the mobile unit 11 is constantly charged by a charger 32 installed in, for example, the car 2. Therefore, the mobile unit 11 can independently move even while electric power supply from the outside is cut off.

Next, processing to be executed by the failure detection device 10 for an elevator according to the first embodiment of the present invention is described with reference to FIG. 4 to FIG. 10.

Processing for Creating Reference Values

First, processing for creating the reference values to be executed by the failure detection device 10 installed in the upper portion of the car 2 is described with reference to a flow chart illustrated in FIG. 4. This processing is executed immediately after the installation and adjustment of all the apparatus in the hoistway 1 are completed.

In Step S401, the control unit 20 moves the car 2 to the lowermost floor to stop the car 2. Specifically, the control unit 20 transmits an instruction signal to the control panel 5, and the control panel 5 that has received the instruction signal performs control for moving the car 2 to the lowermost floor to stop the car 2.

In Step S402, the control unit 20 raises the mobile unit 11 by a set distance. The set distance is, for example, 0.1 m. At the same time, the movement amount calculator 21 of the control unit 20 calculates the movement amount of the mobile unit 11 in the up-down direction in the hoistway 1.

Specifically, the movement amount calculator 21 calculates the movement amount of the mobile unit 11 in the up-down direction with respect to the car 2 by integrating pulse signals output from the built-in encoder 17 of the mobile unit 11.

In Step S403, the distance measurement units 12*a* and 12*b* mounted to the mobile unit 11 each measure the horizontal distances over the entire circumference of 360 degrees centering on itself at the current height position of the mobile unit 11.

Figure 5:
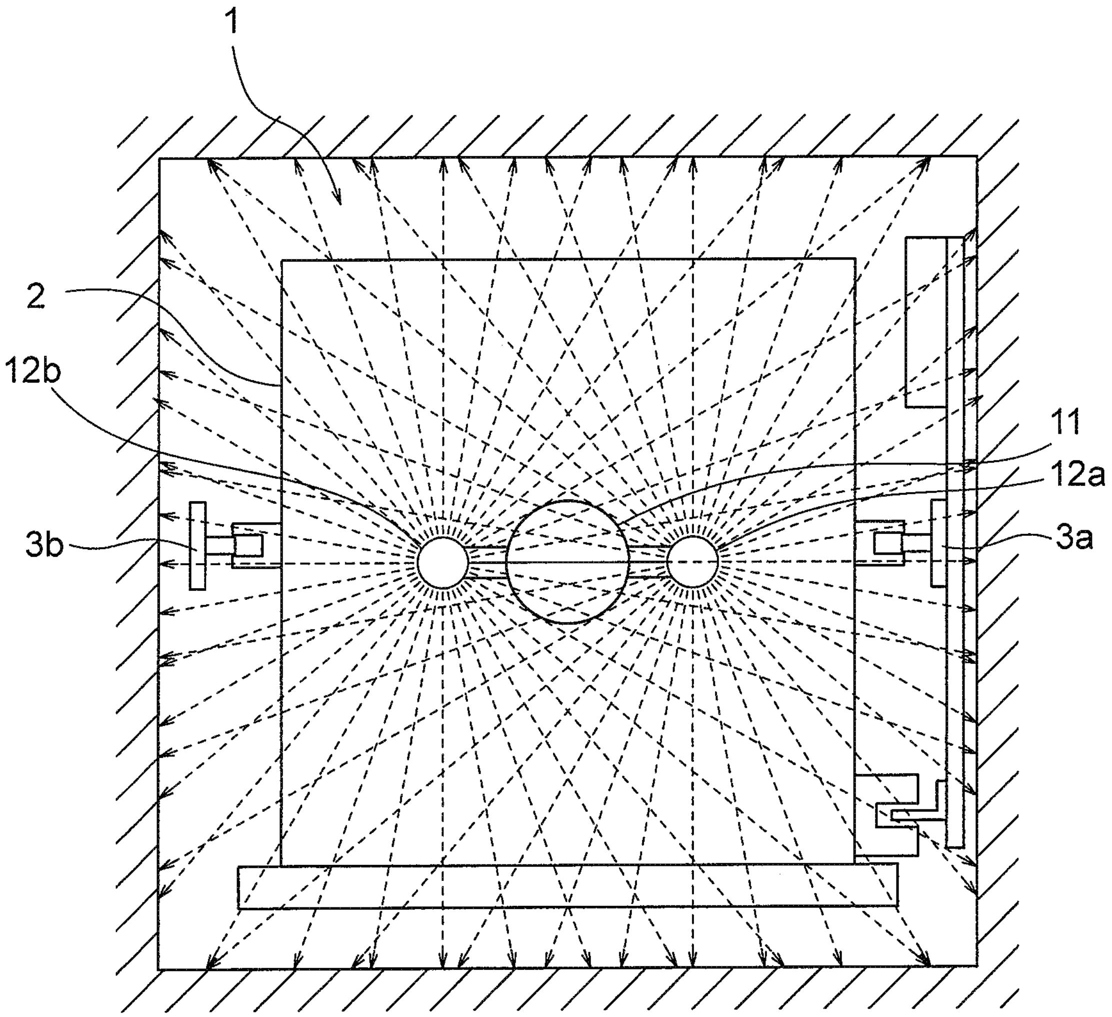
FIG. 5 is an explanatory diagram of measurement of horizontal distances to be performed by the mobile unit of the failure detection device for an elevator according to the first embodiment of the present invention.

Specifically, as illustrated in FIG. 5, the distance measurement units 12*a* and 12*b* each output a laser beam in a horizontal direction at intervals of, for example, 1 degree over the entire circumference of 360 degrees centering on itself. The laser beams output from the distance measurement units 12*a* and 12*b* hit the hoistway wall or the apparatus installed in the hoistway to be reflected, and are again received by the distance measurement units 12*a* and 12*b*.

With the above-mentioned processing, the distance measurement units 12*a* and 12*b* can each measure the horizontal distances from itself to the hoistway wall or the apparatus installed in the hoistway at the current height position of the mobile unit 11 in the hoistway 1 over the entire circumference of 360 degrees.

The horizontal distances measured by the distance measurement units 12*a* and 12*b* in Step S403 are such data as shown in, for example, FIG. 6. In FIG. 6, data in which an angle and a distance are associated with each other is stored in increments of 1 degree from the angle of 0 degrees to the angle of 359 degrees.

In Step S404, the car height position acquirer 22 of the control unit 20 acquires the current height position of the car 2 in the hoistway 1 from the control panel 5. However, in the case of the processing illustrated in FIG. 4, the car 2 is stopped at the lowermost floor at all times, and hence the acquired height position is constantly 0 m.

In Step S405, the measurement value acquirer 23 of the control unit 20 calculates the absolute position of the mobile unit 11 in the hoistway 1, that is, the height position of the mobile unit 11 with respect to the lowermost floor.

Specifically, the measurement value acquirer 23 calculates the absolute position of the mobile unit 11 in the hoistway 1 based on the movement amount of the mobile unit 11 in the up-down direction with respect to the car 2, which is calculated in Step S402, and the height position of the car 2 acquired in Step S404.

In Step S406, the measurement value acquirer 23 of the control unit 20 stores the absolute position of the mobile unit 11 calculated in Step S405 and the horizontal distances measured in Step S403 in association with each other in the reference value storage 19.

In Step S407, the control unit 20 determines whether or not the mobile unit 11 has reached the uppermost floor. Specifically, the control unit 20 compares the absolute position of the mobile unit 11 calculated in Step S405 with a predetermined height position of the uppermost floor to determine whether or not the mobile unit 11 has reached the uppermost floor.

When "NO" is determined in Step S407, that is, when the mobile unit 11 has not reached the uppermost floor, the processing flow returns to Step S402. Meanwhile, when "YES" is determined in Step S407, that is, when the mobile unit 11 has reached the uppermost floor, the processing flow advances to Step S408.

In Step S408, the control unit 20 lowers the mobile unit 11 to return the mobile unit 11 to an initial position, that is, the upper portion of the car 2.

After the above-mentioned processing of from Step S401 to Step S408 is executed, the reference value storage 19 of the control unit 20 stores such data as shown in, for example, FIG. 7.

Figure 4:
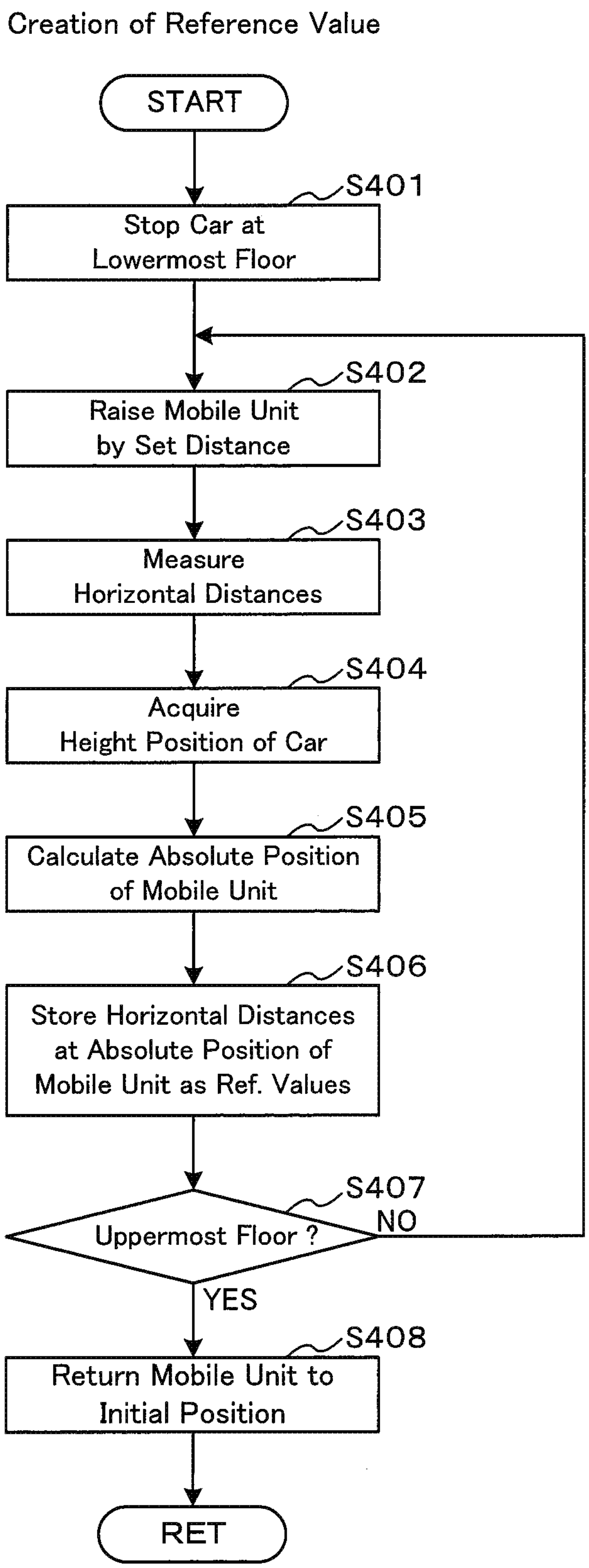
FIG. 4 is a flow chart of processing for creating reference values to be performed by the failure detection device for an elevator according to the first embodiment of the present invention.

The processing illustrated in FIG. 4 may be performed not only immediately after the installation and adjustment of all the apparatus in the hoistway 1 are completed, which is described above, but also even after an operation of the elevator is started, for example, when the apparatus in the hoistway 1 or the position of the apparatus is changed due to a change in specification or another factor.

The processing of FIG. 4 can also be executed by the failure detection device 10 installed in the lower portion of the car 2. That is, the car 2 is stopped at the uppermost floor instead of the lowermost floor, and the mobile unit 11 is lowered until the mobile unit 11 reaches the lowermost floor.

Processing at Time of Maintenance and Inspection

Next, the processing at the time of maintenance and inspection to be executed by the failure detection device 10 installed in the upper portion of the car 2 is described with reference to a flow chart illustrated in FIG. 8. This processing is executed in order to examine whether or not there has occurred any one of the failure of the hoistway wall and the failures including the deformation and drop-out of the apparatus installed in the hoistway at the time of regular maintenance and inspection of the elevator.

In Step S801, the control unit 20 moves the car 2 to the lowermost floor to stop the car 2. Specifically, the control unit 20 transmits an instruction signal to the control panel 5, and the control panel 5 that has received the instruction signal performs control for moving the car 2 to the lowermost floor to stop the car 2.

In Step S802, the control unit 20 raises the mobile unit 11 by a set distance. The set distance is, for example, 0.1 m in the same manner as in the case of the processing for creating the reference values. At the same time, the movement amount calculator 21 of the control unit 20 calculates the movement amount of the mobile unit 11 in the up-down direction in the hoistway 1.

In Step S803, the distance measurement units 12*a* and 12*b* mounted to the mobile unit 11 each measure the horizontal distances over the entire circumference of 360 degrees centering on itself at the current height position of the mobile unit 11.

In Step S804, the car height position acquirer 22 of the control unit 20 acquires the current height position of the car 2 in the hoistway 1 from the control panel 5. However, in the same manner as in the case of the processing for creating the reference values, the height position acquired by the car height position acquirer 22 is constantly 0 m.

In Step S805, the measurement value acquirer 23 of the control unit 20 calculates the absolute position of the mobile unit 11 in the hoistway 1 based on the movement amount of the mobile unit 11 in the up-down direction, which is calculated in Step S802, and the height position of the car 2 acquired in Step S804.

In Step S806, the measurement value acquirer 23 of the control unit 20 acquires the horizontal distances calculated in Step S803 as measurement values at the absolute position of the mobile unit 11 calculated in Step S805 to output the horizontal distances to the determiner 24.

In Step S807, the determiner 24 determines whether or not there has occurred a failure in the hoistway 1 based on the measurement values input from the measurement value acquirer 23 and the reference values corresponding to the horizontal distances stored in the reference value storage 19.

For example, when the measurement values input from the measurement value acquirer 23 are the horizontal distances at an absolute position of 5.0 m, the determiner 24 reads out the reference values at the set position of 5.0 m from the reference value storage 19, and determines whether or not a difference between each measurement value and each reference value is smaller than a predetermined threshold value.

More specifically, assuming that the measurement values are r1 ($\theta_i$) and r2 ($\theta_i$), where i=0, 1, . . . , 359, and the reference values are R1 ($\theta_i$) and R2 ($\theta_i$), where i=0, 1, . . . , 359, the determiner 24 determines whether or not the following evaluation value E is smaller than the threshold value.

$$E=|r1(\theta_i)-R1(\theta_i)|$$

or $$E=|r2(\theta_i)-R2(\theta_i)|$$

When the evaluation value E of the above-mentioned expression is smaller than the predetermined threshold value, the determiner 24 determines that there has occurred none of the failure of the hoistway wall and the failures including the deformation and drop-out of the apparatus installed in the hoistway at the absolute position of 5.0 m in the hoistway 1. In that case, the processing flow advances to Step S809.

Meanwhile, when the evaluation value E of the above-mentioned expression is equal to or larger than the predetermined threshold value, the determiner 24 determines that there has occurred any one of the failure of the hoistway wall and the failures including the deformation and drop-out of the apparatus installed in the hoistway at the absolute position of 5.0 m in the hoistway 1. In that case, the processing flow advances to Step S808.

In Step S808, the control unit 20 issues an alert of failure. After that, the processing flow advances to Step S809.

In Step S809, the control unit 20 determines whether or not the mobile unit 11 has reached the uppermost floor.

When "NO" is determined in Step S809, that is, when the mobile unit 11 has not reached the uppermost floor, the processing flow returns to Step S802. Meanwhile, when "YES" is determined in Step S809, that is, when the mobile unit 11 has reached the uppermost floor, the processing flow advances to Step S810.

In Step S810, the control unit 20 lowers the mobile unit 11 to return the mobile unit 11 to the initial position, that is, the upper portion of the car 2.

After the above-mentioned processing of from Step S801 to Step S810 is executed, it is possible to examine whether or not there has occurred any one of the failure of the hoistway wall and the failures including the deformation and drop-out of the apparatus installed in the hoistway at the time of maintenance and inspection.

Figure 8:
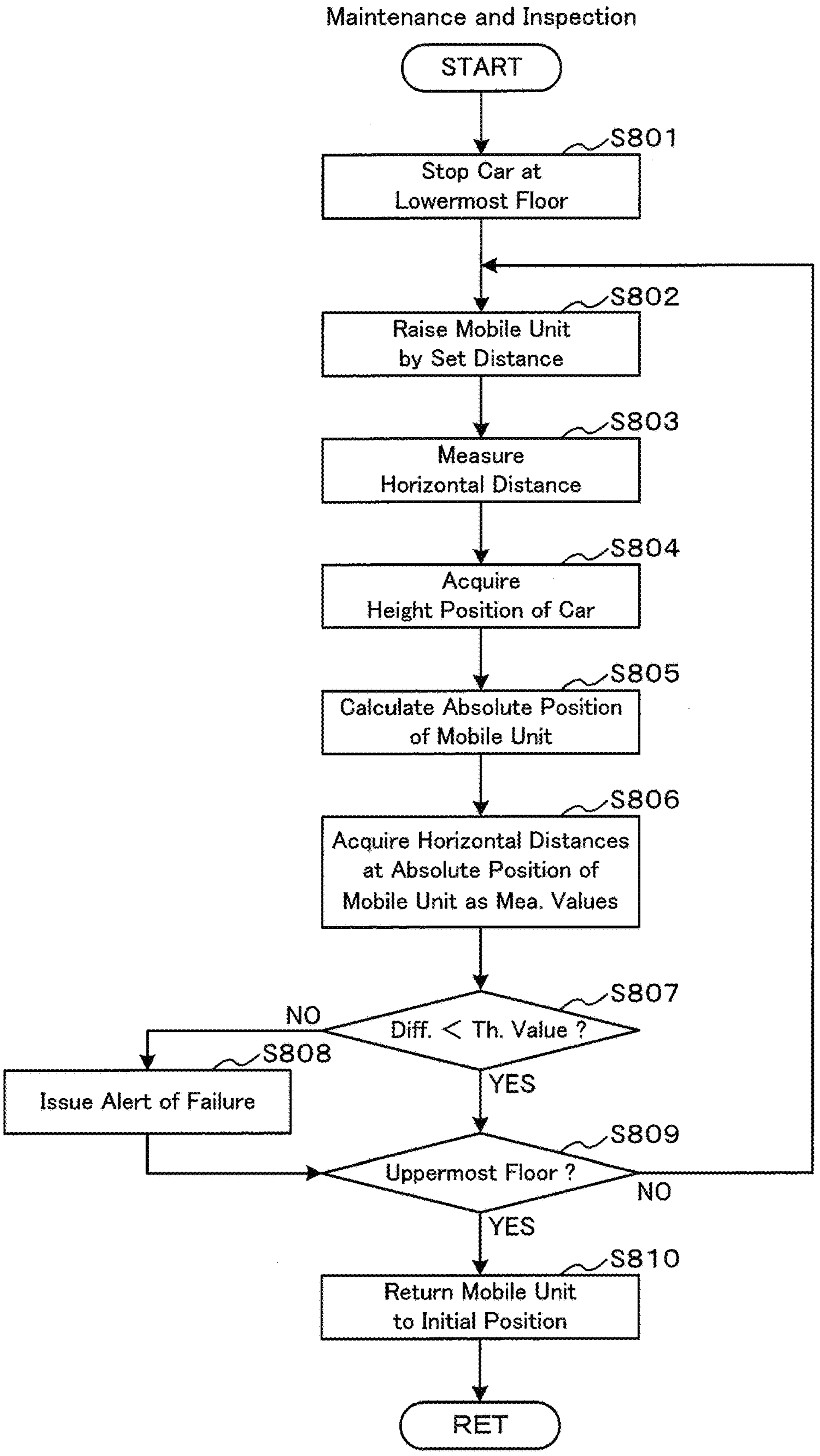
FIG. 8 is a flow chart of processing to be performed at the time of maintenance and management by the failure detection device for an elevator according to the first embodiment of the present invention.

The processing illustrated in FIG. 8 can be executed not only at the time of the above-mentioned regular maintenance and inspection but also, for example, when some failure has been detected during the operation of the elevator and when the apparatus installed in the hoistway 1 has been adjusted without involving a change in its outer appearance.

Further, the processing illustrated in FIG. 8 can be executed by the failure detection device 10 installed in the lower portion of the car 2. That is, the car 2 is stopped at the uppermost floor instead of the lowermost floor, and the mobile unit 11 is lowered until the mobile unit 11 reaches the lowermost floor.

Processing at Time of Occurrence of Earthquake

Figure 9:
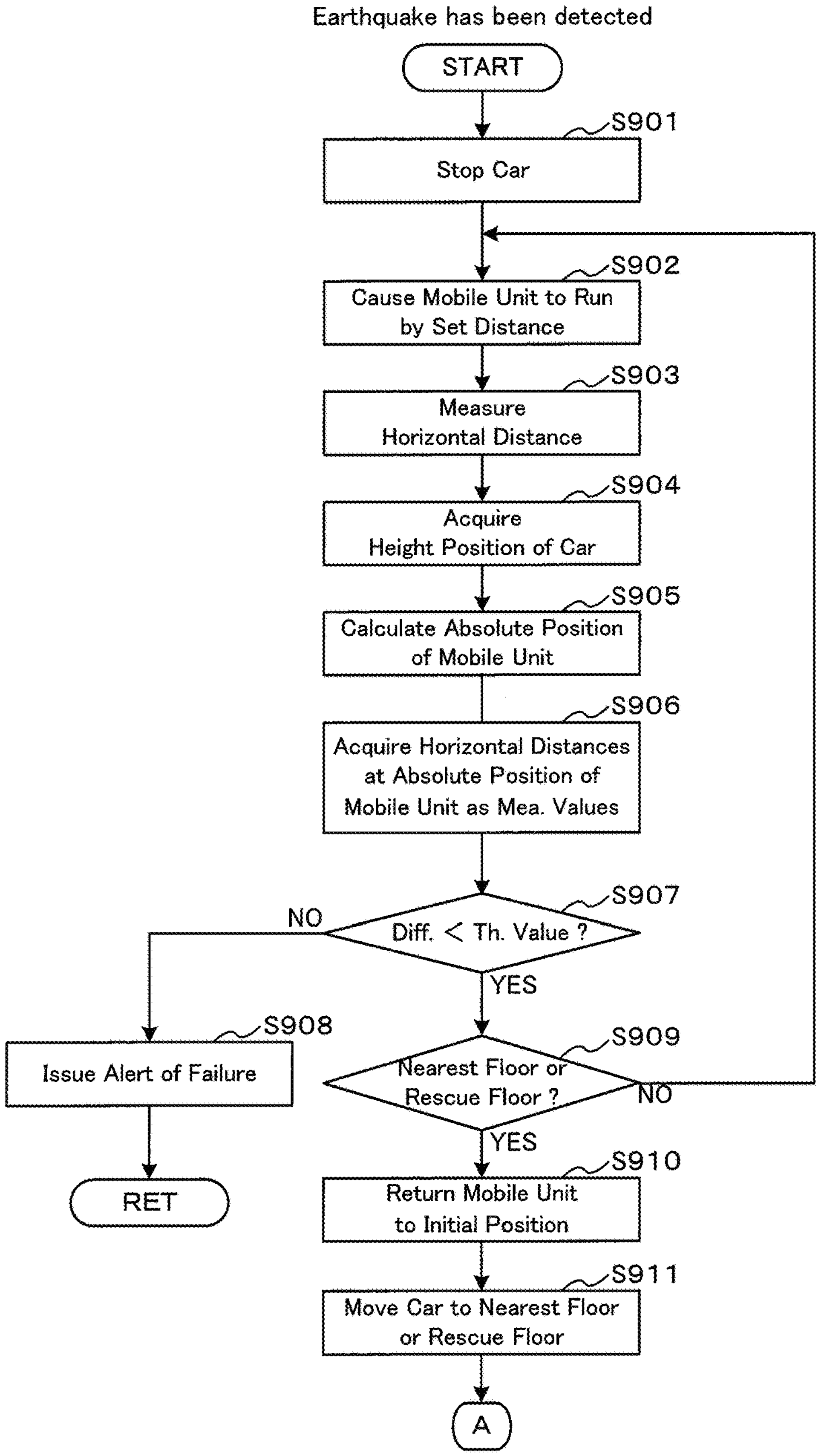
FIG. 9 is a flow chart of processing to be performed at the time of the occurrence of an earthquake by the failure detection device for an elevator according to the first embodiment of the present invention.

Next, processing to be executed at the time of the occurrence of an earthquake by the failure detection device 10 installed in the upper portion and the lower portion of the car 2 is described with reference to flow charts illustrated in FIG. 9, FIG. 10 and FIG. 11. This processing is executed when the control unit 20 receives a detection signal from the earthquake detector 31 illustrated in FIG. 3 during the operation of the elevator.

In Step S901, the control unit 20 immediately stops the car 2 on the spot. Specifically, the control unit 20 transmits an instruction signal to the control panel 5, and the control panel 5 that has received the instruction signal performs control for immediately stopping the car 2 on the spot. This processing may be executed directly by the control panel 5 without intermediation of the control unit 20.

In Step S902, the control unit 20 causes the mobile unit 11 to run by a set distance. When the failure detection device 10 is mounted to the upper portion of the car 2, the set distance is, for example, 0.1 m upward. When the failure detection device 10 is mounted to the lower portion of the car 2, the set distance is, for example, 0.1 m downward. At the same time, the movement amount calculator 21 of the control unit 20 calculates the movement amount of the mobile unit 11 in the up-down direction in the hoistway 1.

In Step S903, the distance measurement units 12*a* and 12*b* mounted to the mobile unit 11 each measure the horizontal distances over the entire circumference of 360 degrees centering on itself at the current height position of the mobile unit 11.

In Step S904, the car height position acquirer 22 of the control unit 20 acquires the current height position of the car 2 in the hoistway 1 from the control panel 5.

In Step S905, the measurement value acquirer 23 of the control unit 20 calculates the absolute position of the mobile unit 11 in the hoistway 1 based on the movement amount of the mobile unit 11 in the up-down direction, which is calculated in Step S902, and the height position of the car 2 acquired in Step S904.

In Step S906, the measurement value acquirer 23 of the control unit 20 acquires the horizontal distances calculated in Step S903 as measurement values at the absolute position of the mobile unit 11 calculated in Step S905 to output the horizontal distances to the determiner 24.

In Step S907, the determiner 24 determines whether or not there has occurred a failure at the current absolute position of the mobile unit 11 in the hoistway 1 based on the measurement values input from the measurement value acquirer 23 and the reference values corresponding to the horizontal distances stored in the reference value storage 19. Specific processing for the determination is the same as the processing described with reference to Step S807 of FIG. 8.

When "NO" is determined in Step S907, that is, when a failure has been detected at the current absolute position of the mobile unit 11, the processing flow advances to Step S908. Meanwhile, when "YES" is determined in Step S907, that is, when a failure has not been detected at the current absolute position of the mobile unit 11, the processing flow advances to Step S909.

In Step S908, the control unit 20 issues an alert of failure.

In Step S909, the control unit 20 determines whether or not the mobile unit 11 has reached a nearest floor or a rescue floor.

When "NO" is determined in Step S909, that is, when the mobile unit 11 has not reached the nearest floor or the rescue floor, the processing flow returns to Step S902. Meanwhile, when "YES" is determined in Step S909, that is, when the mobile unit 11 has reached the nearest floor or the rescue floor, the processing flow advances to Step S910.

In Step S910, the control unit 20 returns the mobile unit 11 to the initial position. That is, when the failure detection device 10 is arranged in the upper portion of the car 2, the control unit 20 returns the mobile unit 11 to the upper portion of the car 2. When the failure detection device 10 is arranged in the lower portion of the car 2, the control unit 20 returns the mobile unit 11 to the lower portion of the car 2.

In Step S911, the control unit 20 moves the car 2 to the nearest floor or the rescue floor, and then opens a door of the car 2. Specifically, the control unit 20 transmits an instruction signal to the control panel 5, and the control panel 5 that has received the instruction signal performs control for moving the car 2 to the nearest floor or the rescue floor and then opening the door. This processing may be executed directly by the control panel 5 without intermediation of the control unit 20.

After the above-mentioned processing of from Step S901 to Step S911 is executed, it is possible to examine whether or not there has occurred any one of the failure of the hoistway wall within a range of from a stop position of the car 2 to the nearest floor or the rescue floor and the failures including the deformation and drop-out of the apparatus installed in the hoistway at the time of the occurrence of an earthquake. When no failures have been detected, the car 2 can be moved to the nearest floor or the rescue floor to allow a passenger to escape.

Figure 10:
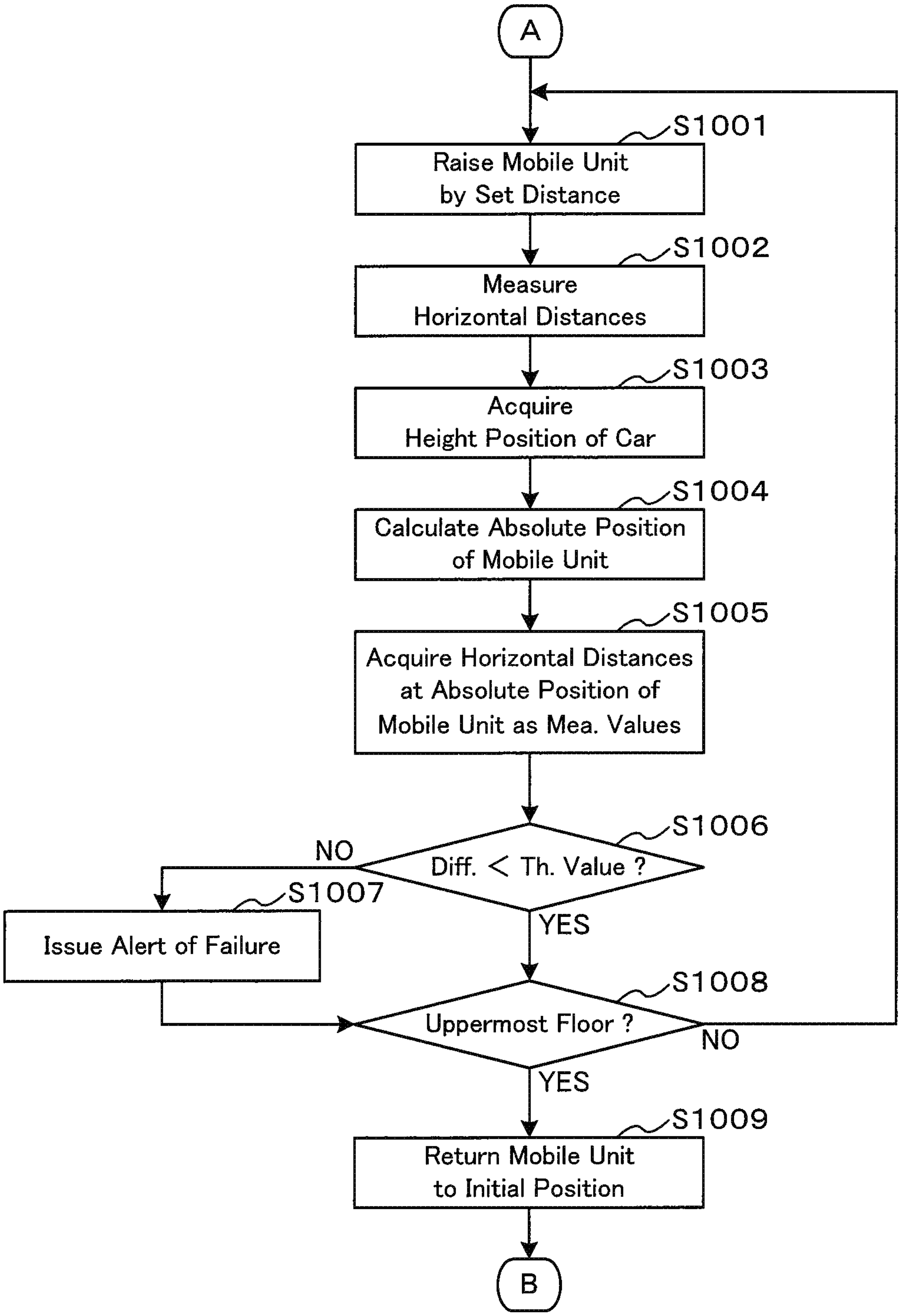
FIG. 10 is a flow chart of the processing to be performed at the time of the occurrence of an earthquake by the failure detection device for an elevator according to the first embodiment of the present invention.

Next, in Step S1001 illustrated in FIG. 10, the control unit 20 raises the mobile unit 11 arranged in the upper portion of the car 2 by a set distance. The set distance is, for example, 0.1 m. At the same time, the movement amount calculator 21 of the control unit 20 calculates the movement amount of the mobile unit 11 in the up-down direction in the hoistway 1.

In Step S1002, the distance measurement units 12*a* and 12*b* mounted to the mobile unit 11 each measure the horizontal distances over the entire circumference of 360 degrees centering on itself at the current height position of the mobile unit 11.

In Step S1003, the car height position acquirer 22 of the control unit 20 acquires the current height position of the car 2 in the hoistway 1 from the control panel 5.

In Step S1004, the measurement value acquirer 23 of the control unit 20 calculates the absolute position of the mobile unit 11 in the hoistway 1 based on the movement amount of the mobile unit 11 in the up-down direction, which is calculated in Step S1001, and the height position of the car 2 acquired in Step S1003.

In Step S1005, the measurement value acquirer 23 of the control unit 20 acquires the horizontal distances measured in Step S1002 as measurement values at the absolute position of the mobile unit 11 calculated in Step S1004 to output the horizontal distances to the determiner 24.

In Step S1006, the determiner 24 determines whether or not there has occurred a failure at the current absolute position of the mobile unit 11 in the hoistway 1 based on the measurement values input from the measurement value acquirer 23 and the reference values corresponding to the horizontal distances stored in the reference value storage 19. Specific processing for the determination is the same as the processing described with reference to Step S807 of FIG. 8.

When "NO" is determined in Step S1006, that is, when a failure has been detected at the current absolute position of the mobile unit 11, the processing flow advances to Step S1007. Meanwhile, when "YES" is determined in Step S1006, that is, when a failure has not been detected at the current absolute position of the mobile unit 11, the processing flow advances to Step S1008.

In Step S1007, the control unit 20 issues an alert of failure. After that, the processing flow advances to Step S1008.

In Step S1008, the control unit 20 determines whether or not the mobile unit 11 has reached the uppermost floor.

When "NO" is determined in Step S1008, that is, when the mobile unit 11 has not reached the uppermost floor, the processing flow returns to Step S1001. Meanwhile, when "YES" is determined in Step S1008, that is, when the mobile unit 11 has reached the uppermost floor, the processing flow advances to Step S1009.

In Step S1009, the control unit 20 lowers the mobile unit 11 to return the mobile unit 11 to the initial position, that is, the upper portion of the car 2.

Figure 11:
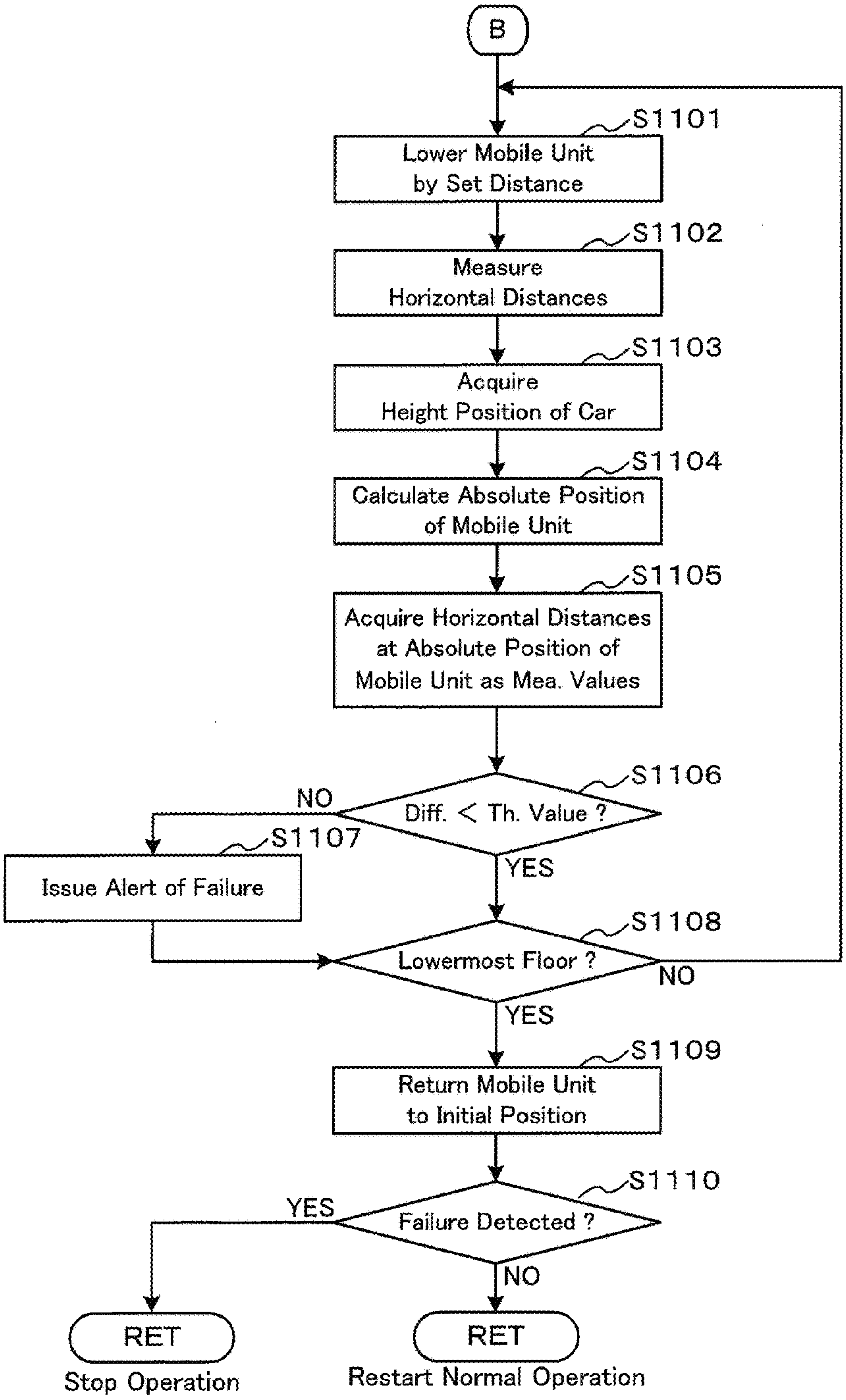
FIG. 11 is a flow chart of the processing to be performed at the time of the occurrence of an earthquake by the failure detection device for an elevator according to the first embodiment of the present invention.

Next, in Step S1101 illustrated in FIG. 11, the control unit 20 lowers the mobile unit 11 arranged in the lower portion of the car 2 by a set distance. The set distance is, for example, 0.1 m. At the same time, the movement amount calculator 21 of the control unit 20 calculates the movement amount of the mobile unit 11 in the up-down direction in the hoistway 1.

In Step S1102, the distance measurement units 12*a* and 12*b* mounted to the mobile unit 11 each measure the horizontal distances over the entire circumference of 360 degrees centering on itself at the current height position of the mobile unit 11.

In Step S1103, the car height position acquirer 22 of the control unit 20 acquires the current height position of the car 2 in the hoistway 1 from the control panel 5.

In Step S1104, the measurement value acquirer 23 of the control unit 20 calculates the absolute position of the mobile unit 11 in the hoistway 1 based on the movement amount of the mobile unit 11 in the up-down direction, which is calculated in Step S1101, and the height position of the car 2 acquired in Step S1103.

In Step S1105, the measurement value acquirer 23 of the control unit 20 acquires the horizontal distances measured in Step S1102 as measurement values at the absolute position of the mobile unit 11 calculated in Step S1104 to output the horizontal distances to the determiner 24.

In Step S1106, the determiner 24 determines whether or not there has occurred a failure at the current absolute position of the mobile unit 11 in the hoistway 1 based on the measurement values input from the measurement value acquirer 23 and the reference values corresponding to the horizontal distances stored in the reference value storage 19. Specific processing for the determination is the same as the processing described with reference to Step S807 of FIG. 8.

When "NO" is determined in Step S1106, that is, when a failure has been detected at the current absolute position of the mobile unit 11, the processing flow advances to Step S1107. Meanwhile, when "YES" is determined in Step S1106, that is, when a failure has not been detected at the current absolute position of the mobile unit 11, the processing flow advances to Step S1108.

In Step S1107, the control unit 20 issues an alert of failure. After that, the processing flow advances to Step S1108.

In Step S1108, the control unit 20 determines whether or not the mobile unit 11 has reached the lowermost floor.

When "NO" is determined in Step S1108, that is, when the mobile unit 11 has not reached the lowermost floor, the processing flow returns to Step S1101. Meanwhile, when "YES" is determined in Step S1108, that is, when the mobile unit 11 has reached the lowermost floor, the processing flow advances to Step S1109.

In Step S1109, the control unit 20 raises the mobile unit 11 to return the mobile unit 11 to the initial position, that is, the lower portion of the car 2.

In Step S1110, the control unit 20 determines whether or not "NO" has been determined at least once in Step S1006 illustrated in FIG. 10 and in Step S1106 illustrated in FIG. 11, that is, whether or not a failure has been detected at any one of height positions in the hoistway 1.

When "YES" is determined in Step S1110, that is, when a failure has been detected at any one of the height positions in the hoistway 1, the control unit 20 or the control panel 5 stops the operation of the elevator. Meanwhile, when "NO" is determined in Step S1110, that is, when no failure has been detected at any one of the height positions in the hoistway 1, the control unit 20 or the control panel 5 restarts the operation of the elevator.

After the above-mentioned processing of from Step S1001 to Step S1110 is executed, it is possible to examine throughout the hoistway 1 whether or not there has occurred any one of the failure of the hoistway wall and the failures including the deformation and drop-out of the apparatus installed in the hoistway at the time of the occurrence of an earthquake.

As described above, the failure detection device 10 according to the first embodiment of the present invention includes: the mobile unit that is movable in the hoistway in the up-down direction independently of the car; and the distance measurement unit mounted to the mobile unit and configured to measure the horizontal distances. Accordingly, it is possible to detect the failure of the hoistway wall and the failures including the deformation and drop-out of the apparatus installed in the hoistway without causing the car to run.

Figure 12:
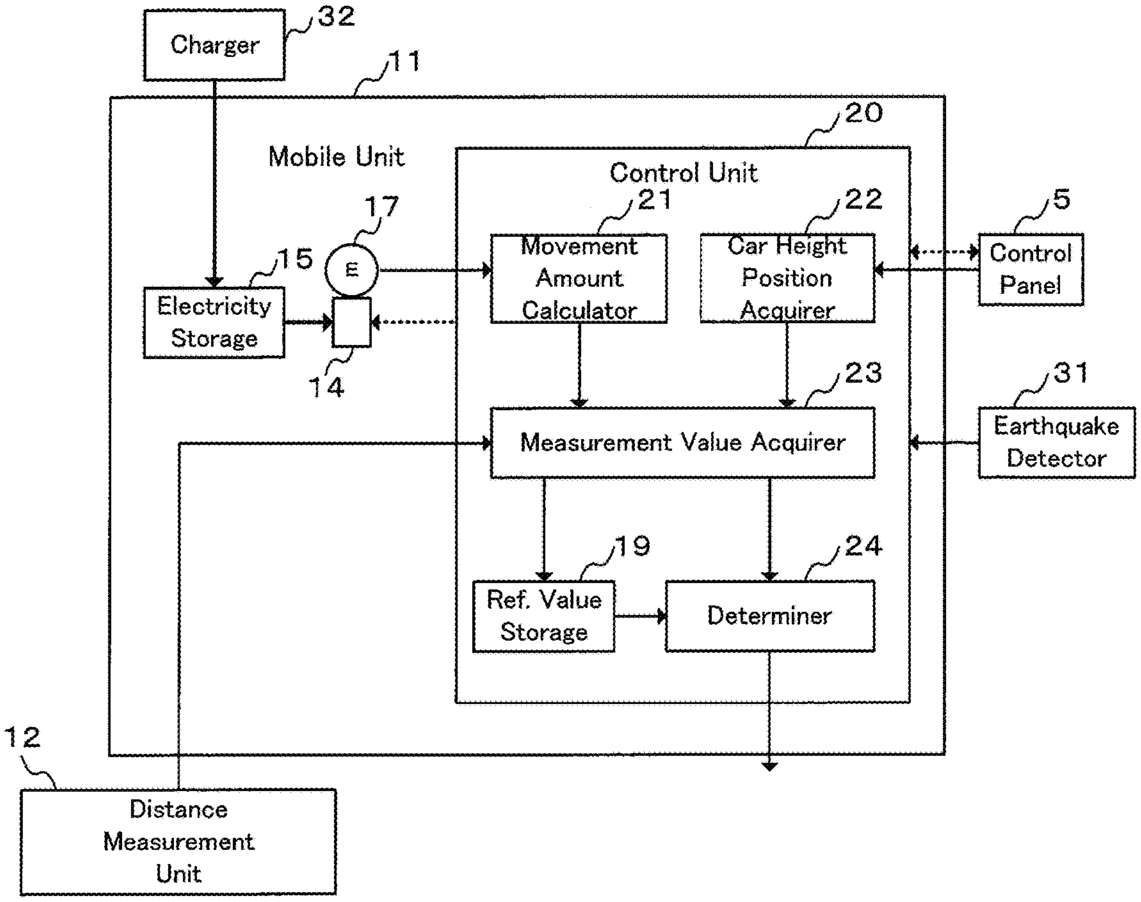
FIG. 12 is a system configuration diagram of a failure detection device for an elevator according to a modification example of the first embodiment of the present invention.

In the first embodiment, the mobile unit 11 and the control unit 20 are formed independently of each other, but as illustrated in, for example, FIG. 12, the control unit 20 may be built into the mobile unit 11. With the control unit 20 being built into the mobile unit 11, the failure detection device can be easily mounted even when the failure detection device is additionally mounted after the installation of the elevator.

Further, in the first embodiment, the failure detection device 10 is mounted to each of the upper portion and the lower portion of the car 2, but in a case of an elevator having no compensating rope, the failure detection device 10 may be mounted only to the upper portion of the car 2.

Further, in the first embodiment, the active wheels 13*a* and 13*b* serve as moving means of the mobile unit 11, but the moving means is not limited thereto. For example, the mobile unit 11 may be configured to move along the car guide rail 3*a* or 3*b* in the hoistway 1.

Further, in the first embodiment, when it is determined whether or not there has occurred a failure in the hoistway 1, it is determined whether or not there has occurred a failure based on whether or not the difference between each measurement value and each reference value is smaller than the predetermined threshold value, but the determination method is not limited thereto. For example, it may be determined whether or not there has occurred a failure based on whether or not a ratio of the measurement value to the reference value is smaller than a predetermined threshold value.

Further, in the first embodiment, such reference values as shown in FIG. 7 are created by executing the processing illustrated in the flow chart of FIG. 4, but the method of creating the reference values is not limited thereto. For example, the reference values may be created by being calculated theoretically based on design values in the hoistway 1.

Figure 13:
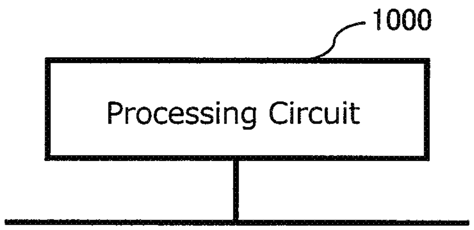
FIG. 13 is a configuration diagram for illustrating a case in which each function of the failure detection device for an elevator according to the first embodiment of the present invention is implemented by a processing circuit being dedicated hardware.
Figure 14:
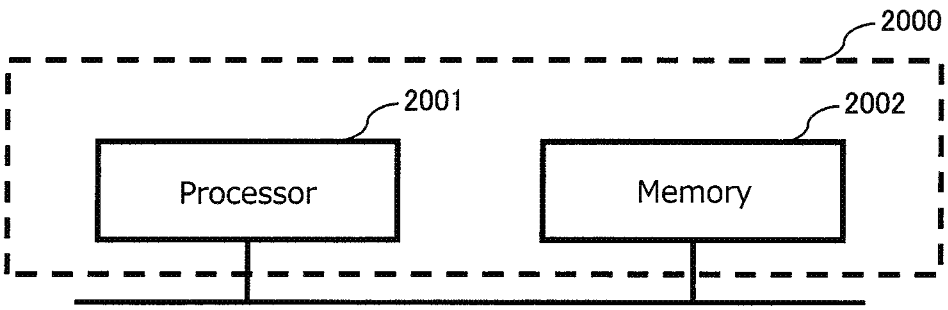
FIG. 14 is a configuration diagram for illustrating a case in which each function of the failure detection device for an elevator according to the first embodiment of the present invention is implemented by a processing circuit including a processor and a memory.

Each of the functions of the failure detection device 10 according to the first embodiment described above is implemented by a processing circuit. The processing circuit for implementing each of the functions may be dedicated hardware, or a processor configured to execute a program stored in a memory. FIG. 13 is a configuration diagram for illustrating a case in which each function of the failure detection device 10 according to the first embodiment of the present invention is implemented by a processing circuit 1000 being dedicated hardware. Further, FIG. 14 is a configuration diagram for illustrating a case in which each function of the failure detection device 10 according to the first embodiment of the present invention is implemented by a processing circuit 2000 including a processor 2001 and a memory 2002.

When the processing circuit is dedicated hardware, the processing circuit 1000 corresponds to, for example, a single circuit, a composite circuit, a programmed processor, a parallel-programmed processor, an application specific integrated circuit (ASIC), a field programmable gate array (FPGA), or a combination thereof. The function of each of the units described above may be implemented by the individual processing circuit 1000, or may be implemented together by one processing circuit 1000.

Meanwhile, when the processing circuit is the processor 2001, the function of each of the units described above is implemented by software, firmware, or a combination of software and firmware. The software and the firmware are coded as a program and stored in the memory 2002. The processor 2001 reads out and executes the program stored in the memory 2002, to thereby implement the function of each of the units. This means that the failure detection device 10 includes the memory 2002 for storing a program that consequently causes each of the steps described above to be executed when being executed by the processing circuit 2000.

It is also understood that those programs cause a computer to execute procedures and methods for the respective units. In this case, the memory 2002 corresponds to, for example, a random access memory (RAM), a read only memory (ROM), a flash memory, an erasable programmable read only memory (EPROM), an electrically erasable and programmable read only memory (EEPROM), or other such non-volatile or volatile semiconductor memory. The memory 2002 also corresponds to, for example, a magnetic disk, a flexible disk, an optical disc, a compact disc, a MiniDisk, or a DVD.

Some of the functions of the respective units described above may be implemented by dedicated hardware, and other thereof may be implemented by software or firmware.

In this manner, the processing circuit can implement the function of each of the units described above by hardware, software, firmware, or a combination thereof.

REFERENCE SIGNS LIST

1 hoistway, 2 car (elevating body), 8 main rope (rope), 9 compensating rope (rope), 10 failure detection device, 11 mobile unit, 12*a*, 12*b* distance measurement unit, 15 electricity storage, 19 reference value storage, 20 control unit, 21 movement amount calculator, 22 car height position acquirer (elevating body height position acquirer), 23 measurement value acquirer, 24 determiner

The invention claimed is:

1. A failure detection device for an elevator comprising:
   - a mobile structure which is movable in a hoistway in an up-down direction independently of an elevating body;
   - a distance measurer which is mounted to the mobile structure, and is configured to measure a horizontal distance; and
   - a controller including:
   - a movement amount calculator configured to control the mobile structure and the distance measurer to calculate a movement amount of the mobile structure in the hoistway in the up-down direction;
   - an elevating body height position acquirer configured to acquire a height position of the elevating body in the hoistway;
   - a reference value storage configured to store, as a reference value, the horizontal distance at a set position in the hoistway;
   - a measurement value acquirer configured to acquire, as a measurement value, the horizontal distance measured by the distance measurer at an absolute position of the mobile structure calculated based on the height position of the elevating body and the movement amount of the mobile structure from the height position of the elevating body, and
   - a determiner configured to determine whether a failure has occurred in the hoistway based on the measurement value and the reference value stored in the reference value storage in association with the absolute position at which the measurement value has been measured.

2. The failure detection device according to claim 1,
   - wherein the mobile structure is configured to move along a rope connected to the elevating body, and
   - wherein the distance measurer is formed of a plurality of distance measurers, the plurality of distance measurers having a center of gravity matching a center of the rope.

3. The failure detection device according to claim 1, wherein the mobile structure includes an electricity storage configured to supply electric power to a drive source of the mobile structure.

4. The failure detection device according to claim 1, wherein the controller is built into the mobile structure.

5. The failure detection device according to claim 1, wherein the reference value is created based on a design value in the hoistway.

6. The failure detection device according to claim 1,
   - wherein the mobile structure to which the distance measurer is mounted is installed in an upper portion of the elevating body, and
   - wherein the reference value is created based on the measurement value measured by the distance measurer when, after the elevating body is stopped at a lowermost floor, the mobile structure is raised until the mobile structure reaches an uppermost floor.

7. The failure detection device according to claim 6, wherein the controller is configured to determine, at a time of maintenance and inspection, whether the failure has occurred in the hoistway based on the reference value and the measurement value measured by the distance measurer when, after the elevating body is stopped at the lowermost floor, the mobile structure is raised until the mobile structure reaches the uppermost floor.

8. The failure detection device according to claim 1,
   - wherein the mobile structure to which the distance measurer is mounted is installed in each of an upper portion and a lower portion of the elevating body, and
   - wherein the controller is configured to immediately stop, at a time of an occurrence of an earthquake, the elevating body to determine whether a failure has occurred in the hoistway within a range of from a stop position of the elevating body to a nearest floor or a rescue floor.

9. The failure detection device according to claim 8, wherein the controller is configured to move the elevating body to the nearest floor or the rescue floor to open a door when no failure is detected in the hoistway within the range of from the stop position of the elevating body to the nearest floor or the rescue floor.

10. The failure detection device according to claim 9, wherein the controller is configured to restart an operation of an elevator when no failure is detected throughout the hoistway.

11. The failure detection device according to claim 1, wherein the distance measurer is configured to acquire, as measurement values, the horizontal distances over an entire circumference of 360 degrees centering on the distance measurer itself, and wherein the controller is configured to determine whether a failure has occurred in the hoistway based on whether a difference between each of the measurement values and each of the reference values over the entire circumference of 360 degrees is smaller than a predetermined threshold value.

* * * * *